(12) United States Patent
Yoshimi et al.

(10) Patent No.: US 7,685,532 B2
(45) Date of Patent: Mar. 23, 2010

(54) DATA INPUT DEVICE, IMAGE PROCESSING DEVICE, DATA INPUT METHOD AND COMPUTER READABLE RECORDING MEDIUM ON WHICH DATA INPUT PROGRAM IS RECORDED

(75) Inventors: Tsutomu Yoshimi, Toda (JP); Kenji Ogasawara, Toda (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 61 days.

(21) Appl. No.: 12/062,154

(22) Filed: Apr. 3, 2008

(65) Prior Publication Data

US 2008/0186286 A1      Aug. 7, 2008

Related U.S. Application Data

(63) Continuation of application No. 10/634,907, filed on Aug. 6, 2003, now abandoned.

(30) Foreign Application Priority Data

Aug. 7, 2002   (JP) ............................. 2002-230306
Aug. 7, 2002   (JP) ............................. 2002-230308

(51) Int. Cl.
      *G06F 3/048*   (2006.01)
(52) U.S. Cl. .................. 715/773; 715/753; 715/800
(58) Field of Classification Search ................ 715/753, 715/773, 800; 345/168
See application file for complete search history.

(56) References Cited

U.S. PATENT DOCUMENTS 5,757,371 A * 5/1998 Oran et al. ................ 715/779
5,852,440 A   12/1998 Grossman et al.
5,920,316 A * 7/1999 Oran et al. ................ 715/779
6,037,939 A   3/2000 Kashiwagi et al.

(Continued)

FOREIGN PATENT DOCUMENTS

JP          5-197471          8/1993

(Continued)

OTHER PUBLICATIONS

Microsoft Press Pass, "Windows XP is Here!", New York, Oct. 25, 2001.*

(Continued)

*Primary Examiner*—William L Bashore
*Assistant Examiner*—David Phantana-angkool
(74) *Attorney, Agent, or Firm*—Buchanan Ingersoll & Rooney PC

(57) ABSTRACT

A method for displaying a plurality of key icons on a display includes displaying a first screen on the display, the first screen having at least one first key icon and a plurality of second key icons, wherein the first key icon corresponds to a first input instruction while each of the second key icons respectively corresponds to a respective one of a set of second input instructions; and displaying a second screen on the display, the second screen having at least one third key icon and a pull down menu, wherein the third key icon is bigger than the first key icon but corresponds to the first input instruction, and the pull down menu corresponds to the set of second input instructions.

12 Claims, 13 Drawing Sheets

U.S. PATENT DOCUMENTS

| | | | |
|---|---|---|---|
| 6,072,486 A | 6/2000 | Sheldon et al. | |
| 6,160,554 A * | 12/2000 | Krause | 715/804 |
| 6,243,724 B1 * | 6/2001 | Mander et al. | 715/273 |
| 6,271,835 B1 | 8/2001 | Hoeksma | |
| 6,272,484 B1 * | 8/2001 | Martin et al. | 707/1 |
| 6,295,052 B1 * | 9/2001 | Kato et al. | 345/179 |
| 6,720,951 B2 | 4/2004 | Taguchi | |
| 6,724,370 B2 | 4/2004 | Dutta et al. | |
| 6,725,427 B2 * | 4/2004 | Freeman et al. | 715/273 |
| 6,781,611 B1 * | 8/2004 | Richard | 715/779 |
| 6,980,312 B1 * | 12/2005 | Czyszczewski et al. | 358/1.15 |
| 7,028,264 B2 * | 4/2006 | Santoro et al. | 715/765 |
| 7,036,086 B2 | 4/2006 | Cobbley et al. | |
| 7,047,500 B2 * | 5/2006 | Roelofs | 715/779 |
| 2002/0196287 A1 | 12/2002 | Taylor et al. | |
| 2003/0013483 A1 | 1/2003 | Ausems | |
| 2004/0085328 A1 * | 5/2004 | Maruyama et al. | 345/619 |

FOREIGN PATENT DOCUMENTS

| | | |
|---|---|---|
| JP | 07-210355 | 8/1995 |
| JP | 07-244568 | 9/1995 |
| JP | 09-097150 | 4/1997 |
| JP | 10-289060 | 10/1998 |
| JP | 2000-3241 | 1/2000 |
| JP | 2000-10689 | 1/2000 |
| JP | 2001-197185 | 7/2001 |
| JP | 2001-306233 | 11/2001 |

OTHER PUBLICATIONS

Stanek R., William; "Microsoft Windows XP Professional Administrator's Pocket Consultant", Sep. 25, 2001; Microsoft Press, Chapter 9, printed p. 1-8.*

McFedries, Paul; "The Complete Idiot's Guide to Windows XP", Table of Contents, Oct. 3, 2001; Alpha Books, Chapter 8: A Tour of the My Pictures Folder—printed p. 1-8, Chapter 11: Sights and Sounds: Music and Other Multimedia—printed p. 1-3, Chapter 26: Renovating My Computer—printed p. 1-7.*

Japanese Official Notice of Reason for Refusal dated Jan. 16, 2007 (with English Translation).

* cited by examiner

SCREEN MODE: COPY MODE

| KEY IMAGE GROUP | KEY IMAGE CLASSIFICATION | CONSTITUTIONAL KEY IMAGE | KEY IMAGE DATA | STATUS | | ATTRIBUTE |
|---|---|---|---|---|---|---|
| | | | | SIZE | POSITION $(X_m, Y_m)$ $(X_n, Y_n)$ | |
| START KEY | SIZE VARIABLE KEY | START | $A_1$ | 100% | $(X_{mA1}, Y_{mA1})$ $(X_{nA1}, Y_{nA1})$ | VARIABLE SIZE, VARIABLE POSITION |
| MODE SWITCHING KEY | BASIC KEY | COPY | $D_1$ | | $(X_{mD1}, Y_{mD1})$ $(X_{nD1}, Y_{nD1})$ | FIXED SIZE, FIXED POSITION |
| | | FAX | $D_2$ | 100% | $(X_{mD2}, Y_{mD2})$ $(X_{nD2}, Y_{nD2})$ | |
| | | SCAN | $D_3$ | | $(X_{mD3}, Y_{mD3})$ $(X_{nD3}, Y_{nD3})$ | |
| | | CONTROL | $D_4$ | | $(X_{mD4}, Y_{mD4})$ $(X_{nD4}, Y_{nD4})$ | |
| SIZE MODIFYING KEY | BASIC KEY | ↑ | $C_1$ | 100% | $(X_{mC1}, Y_{mC1})$ $(X_{nC1}, Y_{nC1})$ | FIXED SIZE, VARIABLE POSITION |
| | | ↓ | $C_2$ | | $(X_{mC2}, Y_{mC2})$ $(X_{nC2}, Y_{nC2})$ | |
| TEN KEY | BASIC KEY | 1 | $B_1$ | 100% | $(X_{mB1}, Y_{mB1})$ $(X_{nB1}, Y_{nB1})$ | FIXED SIZE, VARIABLE POSITION |
| | | ... | ... | | ... | |
| | | 0 | $B_{10}$ | | $(X_{mB10}, Y_{mB10})$ $(X_{nB10}, Y_{nB10})$ | |
| | | . | $B_{11}$ | | $(X_{mB11}, Y_{mB11})$ $(X_{nB11}, Y_{nB11})$ | |
| MAGNIFICATION KEY | APPLICATION KEY | 1.41 | $F_1$ | 100% | $(X_{mF1}, Y_{mF1})$ $(X_{nF1}, Y_{nF1})$ | REDUCIBLE SIZE, VARIABLE POSITION |
| | | 1.21 | $F_2$ | | $(X_{mF2}, Y_{mF2})$ $(X_{nF2}, Y_{nF2})$ | |
| | | 1.00 | $F_3$ | | $(X_{mF3}, Y_{mF3})$ $(X_{nF3}, Y_{nF3})$ | |
| | | 0.80 | $F_4$ | | $(X_{mF4}, Y_{mF4})$ $(X_{nF4}, Y_{nF4})$ | |
| | | 0.71 | $F_5$ | | $(X_{mF5}, Y_{mF5})$ $(X_{nF5}, Y_{nF5})$ | |
| PAPER SIZE KEY | APPLICATION KEY | A3 | $E_1$ | 100% | $(X_{mE1}, Y_{mE1})$ $(X_{nE1}, Y_{nE1})$ | REDUCIBLE SIZE, VARIABLE POSITION |
| | | B4 | $E_2$ | | $(X_{mE2}, Y_{mE2})$ $(X_{nE2}, Y_{nE2})$ | |
| | | A4 | $E_3$ | | $(X_{mE3}, Y_{mE3})$ $(X_{nE3}, Y_{nE3})$ | |
| | | B5 | $E_4$ | | $(X_{mE4}, Y_{mE4})$ $(X_{nE4}, Y_{nE4})$ | |
| | | A5 | $E_5$ | | $(X_{mE5}, Y_{mE5})$ $(X_{nE5}, Y_{nE5})$ | |
| MESSAGE DISPLAY AREA | — | — | $G_1$ | 100% | $(X_{mG1}, Y_{mG1})$ $(X_{nG1}, Y_{nG1})$ | FIXED SIZE, FIXED POSITION |

FIG. 7   22

SCREEN MODE: COPY MODE

| KEY IMAGE GROUP | KEY IMAGE CLASSIFICATION | CONSTITUTIONAL KEY IMAGE | KEY IMAGE DATA | STATUS SIZE | STATUS POSITION $(X_m, Y_m)$ $(X_n, Y_n)$ | ATTRIBUTE |
|---|---|---|---|---|---|---|
| START KEY | SIZE VARIABLE KEY | START | $A_1$ | 200% | $(X_{mA1}', Y_{mA1}')$ $(X_{nA1}', Y_{nA1}')$ | VARIABLE SIZE, VARIABLE POSITION |
| MODE SWITCHING KEY | BASIC KEY | COPY | $D_1$ | 100% | $(X_{mD1}, Y_{mD1})$ $(X_{nD1}, Y_{nD1})$ | FIXED SIZE, FIXED POSITION |
| | | FAX | $D_2$ | | $(X_{mD2}, Y_{mD2})$ $(X_{nD2}, Y_{nD2})$ | |
| | | SCAN | $D_3$ | | $(X_{mD3}, Y_{mD3})$ $(X_{nD3}, Y_{nD3})$ | |
| | | CONTROL | $D_4$ | | $(X_{mD4}, Y_{mD4})$ $(X_{nD4}, Y_{nD4})$ | |
| SIZE MODIFICATION KEY | BASIC KEY | ↑ | $C_1$ | 100% | $(X_{mC1}', Y_{mC1}')$ $(X_{nC1}', Y_{nC1}')$ | FIXED SIZE, VARIABLE POSITION |
| | | ↓ | $C_2$ | | $(X_{mC2}', Y_{mC2}')$ $(X_{nC2}', Y_{nC2}')$ | |
| TEN KEY | BASIC KEY | 1 | $B_1$ | 100% | $(X_{mB1}', Y_{mB1}')$ $(X_{nB1}', Y_{nB1}')$ ... | FIXED SIZE, VARIABLE POSITION |
| | | 0 | $B_{10}$ | | $(X_{mB10}', Y_{mB10}')$ $(X_{nB10}', Y_{nB10}')$ | |
| | | . | $B_{11}$ | | $(X_{mB11}', Y_{mB11}')$ $(X_{nB11}', Y_{nB11}')$ | |
| MAGNIFICATION KEY | APPLICATION KEY | 1.41 | $F_1$ | 50% | $(X_{mF1}', Y_{mF1}')$ $(X_{nF1}', Y_{nF1}')$ | SIZE REDUCIBLE, VARIABLE POSITION |
| | | 1.21 | $F_2$ | | $(X_{mF2}', Y_{mF2}')$ $(X_{nF2}', Y_{nF2}')$ | |
| | | 1.00 | $F_3$ | | $(X_{mF3}', Y_{mF3}')$ $(X_{nF3}', Y_{nF3}')$ | |
| | | 0.80 | $F_4$ | | $(X_{mF4}', Y_{mF4}')$ $(X_{nF4}', Y_{nF4}')$ | |
| | | 0.71 | $F_5$ | | $(X_{mF5}', Y_{mF5}')$ $(X_{nF5}', Y_{nF5}')$ | |
| PAPER SIZE KEY | APPLICATION KEY | A3 | $E_1$ | 50% | $(X_{mE1}', Y_{mE1}')$ $(X_{nE1}', Y_{nE1}')$ | SIZE REDUCIBLE, VARIABLE POSITION |
| | | B4 | $E_2$ | | $(X_{mE2}', Y_{mE2}')$ $(X_{nE2}', Y_{nE2}')$ | |
| | | A4 | $E_3$ | | $(X_{mE3}', Y_{mE3}')$ $(X_{nE3}', Y_{nE3}')$ | |
| | | B5 | $E_4$ | | $(X_{mE4}', Y_{mE4}')$ $(X_{nE4}', Y_{nE4}')$ | |
| | | A5 | $E_5$ | | $(X_{mE5}', Y_{mE5}')$ $(X_{nE5}', Y_{nE5}')$ | |
| MESSAGE DISPLAY AREA | — | — | $G_1$ | 100% | $(X_{mG1}, Y_{mG1})$ $(X_{nG1}, Y_{nG1})$ | FIXED SIZE, FIXED POSITION |

FIG. 10  23

SCREEN MODE: COPY MODE

| KEY IMAGE GROUP | KEY IMAGE CLASSIFICATION | CONSTITUTIONAL KEY IMAGE | KEY IMAGE DATA | STATUS SIZE | STATUS POSITION $(X_m, Y_m)$ $(X_n, Y_n)$ | ATTRIBUTE |
|---|---|---|---|---|---|---|
| START KEY | VARIABLE SIZE KEY | START | $A_1$ | 100% | $(X_{mA1}, Y_{mA1})$ $(X_{nA1}, Y_{nA1})$ | VARIABLE SIZE, VARIABLE POSITION |
| MODE SWITCHING KEY | BASIC KEY | COPY | $D_1$ | 100% | $(X_{mD1}, Y_{mD1})$ $(X_{nD1}, Y_{nD1})$ | FIXED SIZE, FIXED POSITION |
| | | FAX | $D_2$ | | $(X_{mD2}, Y_{mD2})$ $(X_{nD2}, Y_{nD2})$ | |
| | | SCAN | $D_3$ | | $(X_{mD3}, Y_{mD3})$ $(X_{nD3}, Y_{nD3})$ | |
| | | CONTROL | $D_4$ | | $(X_{mD4}, Y_{mD4})$ $(X_{nD4}, Y_{nD4})$ | |
| SIZE MODIFICATION KEY | BASIC KEY | ↑ | $C_1$ | 100% | $(X_{mC1}, Y_{mC1})$ $(X_{nC1}, Y_{nC1})$ | FIXED SIZE, VARIABLE POSITION |
| | | → | $C_2$ | | $(X_{mC2}, Y_{mC2})$ $(X_{nC2}, Y_{nC2})$ | |
| TEN KEY | BASIC KEY | 1 | $B_1$ | 100% | $(X_{mB1}, Y_{mB1})$ $(X_{nB1}, Y_{nB1})$ | FIXED SIZE, VARIABLE POSITION |
| | | ... | ... | | ... | |
| | | 0 | $B_{10}$ | | $(X_{mB10}, Y_{mB10})$ $(X_{nB10}, Y_{nB10})$ | |
| | | . | $B_{11}$ | | $(X_{mB11}, Y_{mB11})$ $(X_{nB11}, Y_{nB11})$ | |
| MAGNIFICATION KEY | APPLICATION KEY | 1.41 | $F_1$ | 100% | $(X_{mF1}, Y_{mF1})$ $(X_{nF1}, Y_{nF1})$ | FIXED SIZE, VARIABLE POSITION |
| | | 1.21 | $F_2$ | | $(X_{mF2}, Y_{mF2})$ $(X_{nF2}, Y_{nF2})$ | |
| | | 1.00 | $F_3$ | | $(X_{mF3}, Y_{mF3})$ $(X_{nF3}, Y_{nF3})$ | |
| | | 0.80 | $F_4$ | | $(X_{mF4}, Y_{mF4})$ $(X_{nF4}, Y_{nF4})$ | |
| | | 0.71 | $F_5$ | | $(X_{mF5}, Y_{mF5})$ $(X_{nF5}, Y_{nF5})$ | |
| | | 1.41 – 0.71 SCROLL | $F_6$ | NO DISPLAY | NO DISPLAY | |
| PAPER SIZE KEY | APPLICATION KEY | A3 | $E_1$ | 100% | $(X_{mE1}, Y_{mE1})$ $(X_{nE1}, Y_{nE1})$ | FIXED SIZE, VARIABLE POSITION |
| | | B4 | $E_2$ | | $(X_{mE2}, Y_{mE2})$ $(X_{nE2}, Y_{nE2})$ | |
| | | A4 | $E_3$ | | $(X_{mE3}, Y_{mE3})$ $(X_{nE3}, Y_{nE3})$ | |
| | | B5 | $E_4$ | | $(X_{mE4}, Y_{mE4})$ $(X_{nE4}, Y_{nE4})$ | |
| | | A5 | $E_5$ | | $(X_{mE5}, Y_{mE5})$ $(X_{nE5}, Y_{nE5})$ | |
| | | A2 – A5 SCROLL | $E_6$ | NO DISPLAY | NO DISPLAY | |
| MESSAGE DISPLAY AREA | — | — | $G_1$ | 100% | $(X_{mG1}, Y_{mG1})$ $(X_{nG1}, Y_{nG1})$ | FIXED SIZE, FIXED POSITION |

FIG. 12

SCREEN MODE: COPY MODE

| KEY IMAGE GROUP | KEY IMAGE CLASSIFICATION | CONSTITUTIONAL KEY IMAGE | KEY IMAGE DATA | STATUS | | ATTRIBUTE |
|---|---|---|---|---|---|---|
| | | | | SIZE | POSITION $(X_m, Y_n)$ $(X_n', Y_n')$ | |
| START KEY | VARIABLE SIZE KEY | START | $A_1$ | 200% | $(X_{mA1}, Y_{mA1})$ $(X_{nA1}', Y_{nA1}')$ | VARIABLE SIZE, VARIABLE POSITION |
| MODE SWITCHING KEY | BASIC KEY | COPY | $D_1$ | 100% | $(X_{mD1}, Y_{mD1})$ $(X_{nD1}, Y_{nD1})$ | FIXED SIZE, FIXED POSITION |
| | | FAX | $D_2$ | | $(X_{mD2}, Y_{mD2})$ $(X_{nD2}, Y_{nD2})$ | |
| | | SCAN | $D_3$ | | $(X_{mD3}, Y_{mD3})$ $(X_{nD3}, Y_{nD3})$ | |
| | | CONTROL | $D_4$ | | $(X_{mD4}, Y_{mD4})$ $(X_{nD4}, Y_{nD4})$ | |
| SIZE MODIFICATION KEY | BASIC KEY | ↑ | $C_1$ | 100% | $(X_{mC1}, Y_{mC1})$ $(X_{nC1}, Y_{nC1})$ | FIXED SIZE, VARIABLE POSITION |
| | | → | $C_2$ | | $(X_{mC2}, Y_{mC2})$ $(X_{nC2}, Y_{nC2})$ | |
| TEN KEY | BASIC KEY | 1 | $B_1$ | 100% | $(X_{mB1}, Y_{mB1})$ $(X_{nB1}', Y_{nB1}')$ | FIXED SIZE, VARIABLE POSITION |
| | | ... | ... | | ... | |
| | | 0 | $B_{10}$ | | $(X_{mB10}, Y_{mB10})$ $(X_{nB10}', Y_{nB10}')$ | |
| | | . | $B_{11}$ | | $(X_{mB11}, Y_{mB11})$ $(X_{nB11}', Y_{nB11}')$ | |
| MAGNIFICATION KEY | APPLICATION KEY | 1.41 | $F_1$ | NO DISPLAY | NO DISPLAY | FIXED SIZE, VARIABLE POSITION |
| | | 1.21 | $F_2$ | | | |
| | | 1.00 | $F_3$ | | | |
| | | 0.80 | $F_4$ | | | |
| | | 0.71 | $F_5$ | | | |
| | | 1.41 – 0.71 SCROLL | $F_6$ | 100% | $(X_{mE6}, Y_{mE6})$ $(X_{nE6}, Y_{nE6})$ | |
| PAPER SIZE KEY | APPLICATION KEY | A3 | $E_1$ | NO DISPLAY | NO DISPLAY | FIXED SIZE, VARIABLE POSITION |
| | | B4 | $E_2$ | | | |
| | | A4 | $E_3$ | | | |
| | | B5 | $E_4$ | | | |
| | | A5 | $E_5$ | | | |
| | | A2 – A5 SCROLL | $E_6$ | 100% | $(X_{mE6}, Y_{mE6})$ $(X_{nE6}, Y_{nE6})$ | |
| MESSAGE DISPLAY AREA | — | — | $G_1$ | 100% | $(X_{mG1}, Y_{mG1})$ $(X_{nG1}, Y_{nG1})$ | FIXED SIZE, FIXED POSITION |

DATA INPUT DEVICE, IMAGE PROCESSING DEVICE, DATA INPUT METHOD AND COMPUTER READABLE RECORDING MEDIUM ON WHICH DATA INPUT PROGRAM IS RECORDED

This application is a continuation of U.S. application Ser. No. 10/634,907, which was filed on Aug. 6, 2003, and which is based on Japanese Patent Application No. 2002-230306 filed on Aug. 7, 2002, and 2002-230308 filed on Aug. 7, 2002, the contents of which are hereby incorporated by reference

BACKGROUND OF THE INVENTION

1. Field of the Invention

The invention relates to a data input device, in particular, a data input device that is capable of showing a plurality of key images on its display screen, and entering data assigned to said key images when input designation areas are designated on said display screen.

2. Description of Related Art

The use of various multi-function peripheral ("MFP") devices having multiple functions such as scanning, printing and copying has become popular in recent years. On such an MFP, an operating panel using a touch panel is normally adopted as a data input unit. Such an operating panel has a touch panel provided on the display screen to show various operating key images, detects that a input designation area that corresponds to a specific key image is designated by the user by means of the touch panel, and enters the data assigned to said key image.

In case of such an operating panel, due to an increasing number of varieties and complexities of MFP's functions, it is keenly needed to make the operating screen easier to understand and simpler to operate; for example, it is strongly desired to develop a data input device capable of allowing the operator to customize the operating screen easily, for example, modifying the sizes of certain keys depending on frequencies of their uses, rather than displaying all operating keys simultaneously in the same mode.

In the meanwhile, a data input device using a touch panel with a capability of modifying the key sizes has been disclosed (JP-A-5-197471), but said device is for the operator to select desired key sizes from the prearranged key size table so that it was incapable of allowing the operator to modify the sizes of specific operating keys sizes arbitrarily and automatically modifies the layout of other operating keys.

SUMMARY OF THE INVENTION

The invention is made to solve the aforementioned problems of the prior art, and it intends to provide a data input device that is capable of showing a plurality of key images on its display screen, and, when an input designation area is designated corresponding to the display area of a key image on said display screen, entering data assigned to said key image; in particular, such a data input device that allows the operator to modify the sizes of specific operating keys arbitrarily and automatically modifies the layout of other operating keys.

Said objective of the present invention can be accomplished by the following means:

(1) A data input device for displaying a group of key images on a display screen and when an input designation area is designated on said display screen corresponding to a display area for each key image belonging to said group of key images, entering data assigned to said key image, comprising: a key image size modifying unit for modifying the size of a first key image among said group of key images; a key image layout modifying unit for modifying the layout of said group of key images with modifying the size of said first key image; and a key image display modifying unit that reduces the size of a second key image among said group of key images when it becomes impossible to display all the key images belonging to said group of key images simultaneously on said display screen as a result of modifying the size of said first key image.

(2) An image processing device comprising: at least two items selected from a group consisting of an image reading device for obtaining image data by reading document images, a printing device for printing the image data; and a transmitting device for transmitting the image data; and a data input device described in (1).

(3) A data input method for a data input device for displaying a group of key images on a display screen and when an input designation area is designated on said display screen corresponding to a display area for each key image belonging to said group of key images, entering data assigned to said key image, comprising: a step of modifying the size of a first key image among said group of key images; a step of modifying the layout of said group of key images with modifying the size of said first key image; and a step of reducing the size of a second key image among said group of key images when it becomes impossible to display all the key images belonging to said group of key images simultaneously on said display screen as a result of modifying the size of said first key image.

(4) A computer readable recording medium on which a data input program is recorded, said program causing a data input device for displaying a group of key images on a display screen and when an input designation area is designated on said display screen corresponding to a display area for each key image belonging to said group of key images, entering data assigned to said key image, to execute: a step of modifying the size of a first key image among said group of key images; a step of modifying the layout of said group of key images with modifying the size of said first key image; and a step of reducing the size of a second key image among said group of key images when it becomes impossible to display all the key images belonging to said group of key images simultaneously on said display screen as a result of modifying the size of said first key image.

(5) A data input device for displaying a first group of key images on a display screen and when an input designation area is designated on said display screen corresponding to a display area for each key image belonging to said first group of key images, entering data assigned to said key image, comprising: a key image size modifying unit for modifying the size of a first key image among said first group of key images; a key image layout modifying unit for modifying the layout of said first group of key images with modifying the size of said first key image; and a key image display modifying unit for displaying a second key image for selecting and designating data to be entered from data assigned to key images belonging to a second group of key images in place of the second group of key images among said first group of key images when it becomes impossible to display all the key images belonging to said first group of key images simultaneously on said display screen as a result of modifying the size of the first key image.

(6) An image processing device comprising: at least two items selected from a group consisting of an image reading device for obtaining image data by reading document images, a printing device for printing the image data; and a transmitting device for transmitting the image data; and a data input device described in (5).

(7) A data input method for a data input device for displaying a first group of key images on a display screen and when an input designation area is designated on said display screen corresponding to a display area for each key image belonging to said first group of key images, entering data assigned to said key image, comprising: a step of modifying the size of a first key image among said first group of key images; a step of modifying the layout of said first group of key images with modifying the size of said first key image; and a step of displaying a second key image for selecting and designating data to be entered from data assigned to key images belonging to a second group of key images in place of the second group of key images among said first group of key images when it becomes impossible to display all the key images belonging to said first group of key images simultaneously on said display screen as a result of modifying the size of the first key image.

(8) A computer readable recording medium on which a data input program is recorded, said program causing a data input device for displaying a first group of key images on a display screen and when an input designation area is designated on said display screen corresponding to a display area for each key image belonging to said first group of key images, entering data assigned to said key image, to execute: a step of modifying the size of a first key image among said first group of key images; a step of modifying the layout of said first group of key images with modifying the size of said first key image; and a step of displaying a second key image for selecting and designating data to be entered from data assigned to key images belonging to a second group of key images in place of the second group of key images among said first group of key images when it becomes impossible to display all the key images belonging to said first group of key images simultaneously on said display screen as a result of modifying the size of the first key image.

BRIEF DESCRIPTION OF THE DRAWINGS

FIG. 4 is an example of initial screen control information of MFP 1a shown in FIG. 3.

FIG. 7 is an example of updated screen control information by further enlarging the size of the key image of the size variable key and modifying the layout of the screen of display 14a shown in FIG. 6.

FIG. 10 is an example of initial screen control information of MFP 1b shown in FIG. 9.

FIG. 12 is an example of updated screen control information by further enlarging the size of the key image of the size variable key and modifying the layout of the screen of display 14a shown in FIG. 11.

DESCRIPTION OF THE PREFERRED EMBODIMENTS

The preferred embodiments of the invention will be described in detail below with reference to the accompanying drawings.

Figure 1:
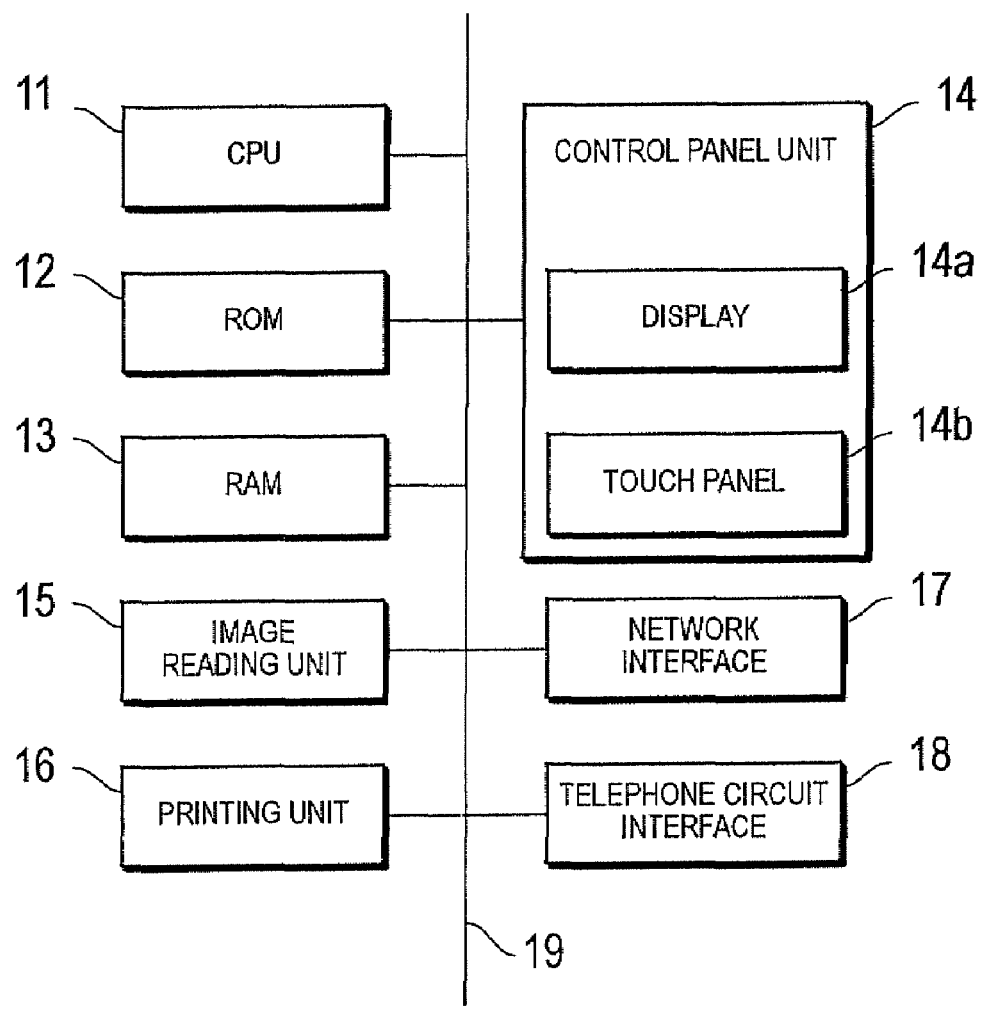
FIG. 1 is a block diagram showing the constitution of an MFP 1a according to a first embodiment of the invention.

FIG. 1 is a block diagram showing the constitution of MFP 1a according to a first embodiment of the invention. As shown in FIG. 1, MFP 1a contains a CPU 11, a ROM 12, a RAM 13, an operating panel unit 14, an image reading unit 15, a printing unit 16, a network interface 17, and a telephone circuit interface 18, all of which are interconnected each other via a bus 19 for exchanging signals.

CPU 11 controls various parts indicated above and executes various arithmetic processes according to a program. ROM 12 stores various programs and parameters. RAM 13 stores programs and data temporarily as a working area. An operating panel unit 14 consists of a display 14a, a touch panel 14b provided on the screen of display 14a, a display control unit (not shown), etc. Display 14a consists of a liquid crystal display, a CRT and the like, and displays various operating keys and information. Touch panel 14b can be of an electronic, electrostatic, optical or ultrasonic type or other types, and detects the information of the position where the panel is touched. When the user designates a key image displayed on the screen of display 14a, operating panel unit 14 identifies the key image designated through touch panel 14b and enters the data assigned to said key image.

Image reading unit 15 casts light on a document set on a specified location from a light source such as a fluorescent lamp and the like, converts reflected lights from the document surface into electrical signals with the help of light sensitive devices such as CCD or CIS, and generates image data (bitmap data) from the electrical signals. Image reading unit 15 is also equipped with an automatic document feeder ("ADF") that transfers a document consisting of multiple sheets one sheet at a time to the specified location so that they can be readed sequentially. Printing unit 16 prints the image data after image processing according to the setup condition.

Network interface 17 is an interface to connect with a network for communicating with other devices on the network using standards such as Ethernet.RTM., Token Ring, FDDI, etc. Telephone circuit interface 18 is an interface for connecting MFP 1a with telephone channels.

MFP 1a has a copying machine's function for copying documents and a conventional facsimile machine's function for send and receive image data via telephone circuits, as well as, by means of connecting with a network, a scanner's function for scanning documents and transmitting the image data to other devices on the network and a printer's function of printing based on printing jobs received from other devices on the network.

Figure 2:
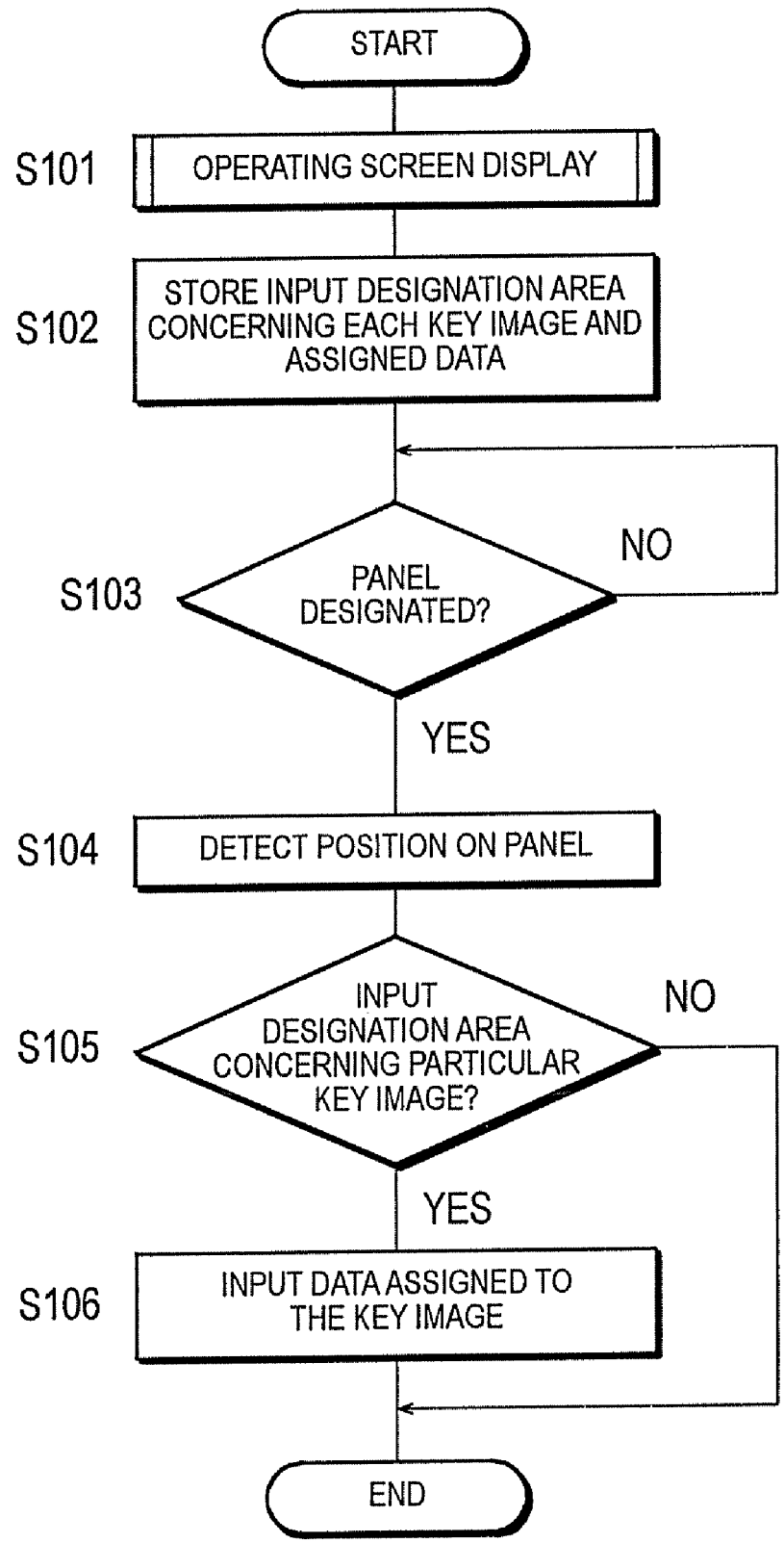
FIG. 2 is a flowchart showing the procedure of data input process of an operating panel unit 14 of MFP 1a shown in FIG. 1.

FIG. 2 is a flowchart showing the procedure of data input process of an operating panel unit 14 of MFP 1a in this embodiment. The algorithm shown in the flow chart of FIG. 2 is stored as a program in ROM 12 of MFP 1a and executed by CPU 11. However, said program can be stored and executed in the display control unit (not shown) in operating panel unit 14.

In FIG. 2, MFP 1*a* displays an operating screen containing key images of various operating keys on display 14*a* of operating panel unit 14 (S101), and simultaneously stores the input designation area on touch panel 14*b* corresponding to the display area on display 14*a* for each key image on the operating screen and the data assigned to each key image to RAM 13 (S102). Next, the system waits for the user to designate touch panel 14*b* on the screen of display 14*a* (S103: No). When the user designates touch panel 14*b* by designating a key image displayed on the screen of display 14*a*, the system detects it through touch panel 14*b* (S103: Yes), and detects the position information of the position designated on touch panel 14*b* (S104) If the detected position information is included in the input designation area on touch panel 14*b* corresponding to the display area of the particular key image (S105: Yes), a judgment is made that said key image is designated and the data assigned to said key image is entered (S106).

Figure 3:
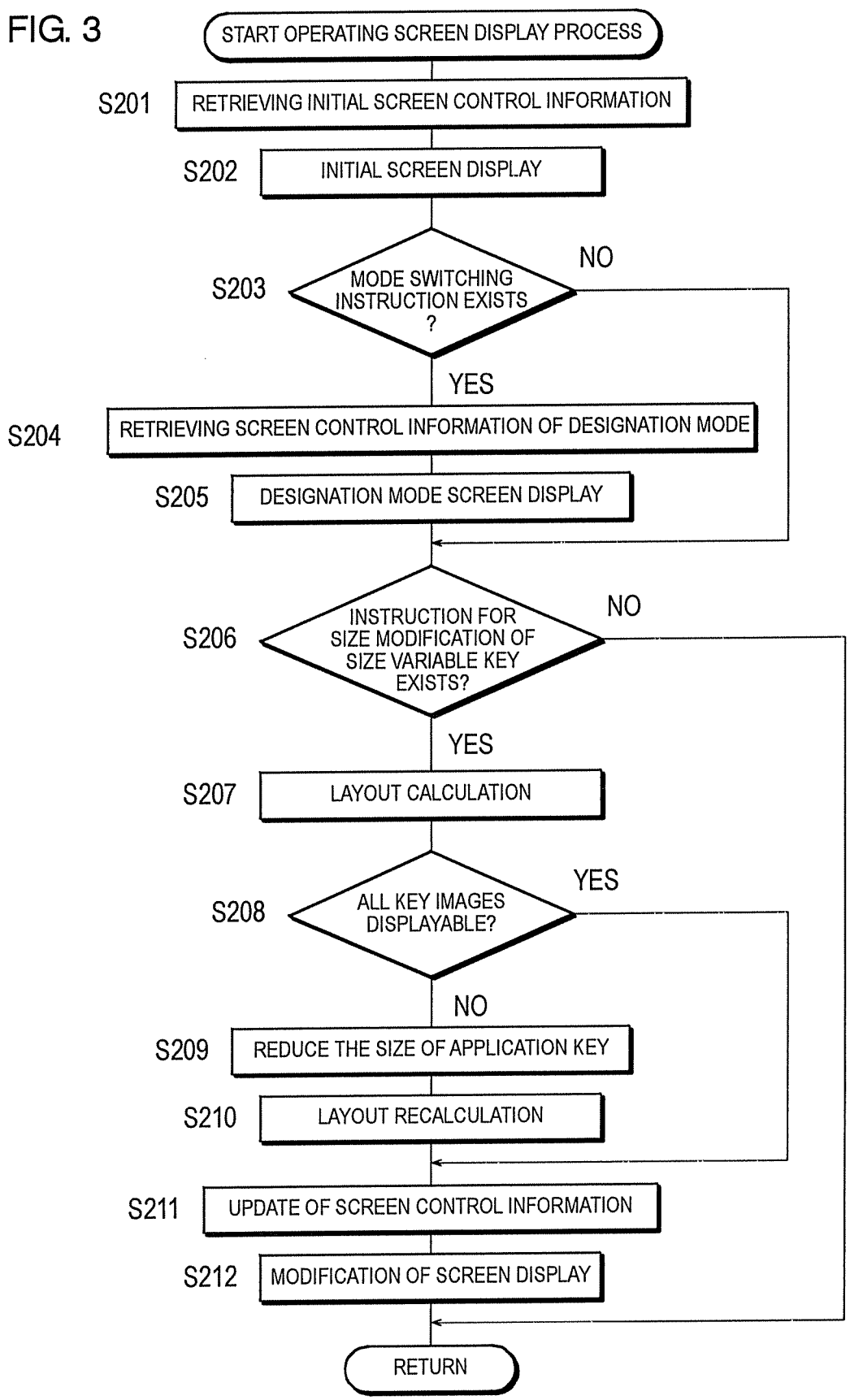
FIG. 3 is a flowchart showing the procedure of operating screen display process of operating panel unit 14 of MFP 1a shown in FIG. 2.

Next, the procedure of the operating screen display process on operating panel unit 14 of MFP 1*a*, which is the unique feature of this embodiment, will be described. FIG. 3 is a flowchart showing the procedure of operating screen display process of an operating panel 14 of MFP 1*a*. In FIG. 3, MFP 1*a* first retrieves the initial screen control information stored in ROM 12 onto RAM 13 (S201), and displays the initial screen on display 14*a* of operating panel unit 14 based on the initial screen control information (S202). FIG. 4 is an example of initial screen control information of MFP 1*a* in this embodiment. In FIG. 4, initial screen control information 21 contains such information as "screen mode," "key image group," "key image classification," "constitutional key image," "key image data," "status," "attribute," etc.

"Screen mode" here means the types of screens that can be displayed on display 14*a*, and includes "copy mode" for displaying the copying operation screen, "fax mode" for displaying the facsimile operation screen, "scan mode screen" for displaying the scanner operation screen, "management mode" for displaying the management setup screen, etc. The screen mode is set to the copy mode in initial screen control information 21, so that the initial screen is the copy operation screen in this embodiment.

"Key image group" denotes the type of a key image group constituting of key images having the same kind of functions to be displayed on display 14*a*, and includes, depending on the screen mode, "start key," "ten key," "size modifying key," "mode switching key," "paper size key," "magnification key," etc.

"Key image classification" denotes the classification of the key images in the operating screen display process depending on the mode of display modification, and includes three classifications; "size variable key," "basic key," and "application key." "Size variable key" allows a key image to have various sizes, so that the user can arbitrarily enlarge or reduce the size of the key image within a specified range by operating the size modifying key. "Basic key" is a key image to be displayed in a fixed size on the same screen no matter how the size of the size variable key is modified. "Application key" is a key image to be displayed in a reduced size, when it becomes impossible to display all the key images simultaneously on the screen due to a size modification of the size variable key. In initial screen control information 21, the start key is set as a size variable key, the mode switching key, the size modifying key, and the ten key are set as basic keys, while the magnification key and the paper size key are set as application keys. Although the key image classification is assigned to each key image group in this embodiment, it can be so arranged to divide a single key image group into separate groups and assign a plurality of key image classifications to them, or assign a key image classification to each individual key image rather than to a key image group. It can be constituted in such a way as to allow a person to assign each key image group to a specific key image classification arbitrarily, wherein any user, or a person with a specific authority such as an administrator through a control screen protected by a password, can modify or set it by editing the screen control information.

"Constitutional key image" denotes the key images that constitute a key image group, while "key image data" denotes the file name of a key image. "Status" denotes the status of a key image on display 14*a* and indicates the size (scale) and the position information of the key image on the screen, etc. "Attribute" denotes information such as whether the size of a key image can be modified, or whether its position can be modified.

Figure 5:
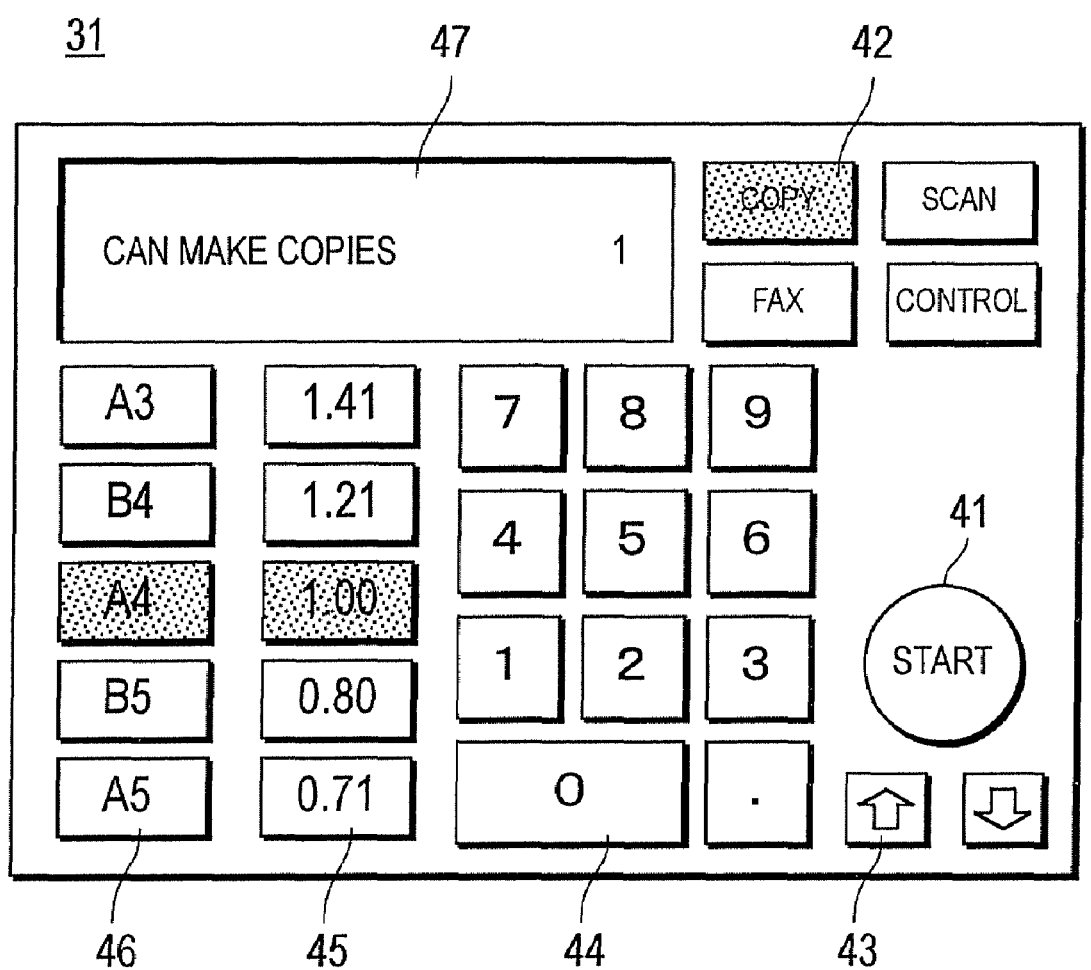
FIG. 5 shows an example of an initial screen displayed on a display 14a of control panel 14 of MFP 1a based on the initial screen control information shown in FIG. 4.

FIG. 5 shows an example of an initial screen displayed on a display 14*a* of control panel 14 of MFP 1*a* based on the initial screen control information shown in FIG. 4. In FIG. 5, key images related to start key 41, mode switching key 42, size modifying key 43, ten key 44, magnification key 45 and paper size key 46, as well as message display area 47 are displayed in their specified sizes on screen 31 base on initial screen control information 21.

In FIG. 3, when the user enters a mode switching instruction by means of designating mode switching key 42 on display 14*a* (S203: Yes), screen control information of designated mode stored on ROM 12 is retrieved onto RAM 13 in a similar manner as in step S201 and S202 (S204), and displays a screen of designated mode on display 14*a* based on the screen control information thus retrieved (S205).

Next, when the user enters an instruction for modifying the size of a size variable key by means of designating size modifying key 43 on display 14*a* (S206: Yes), MFP 1*a* calculates the layout of the operating screen when the image size of the size variable key is modified according to the size entered by the user (S207), and makes a judgment whether it is possible to display all the key images to be displayed on the screen simultaneously (S208). If it determines that it is possible to display all the key images on the screen simultaneously (S208: Yes), the screen control information is updated by registering the position information of each key image according to the calculated layout to the screen control information (S211), and the operating screen is displayed on display 14*a* based on the new layout modified according to said screen control information (S212) to terminate the operating screen display process.

The layout modification of the operating screen due to the size modification of the size variable key in this embodiment will be conducted by adjusting the spacing between each adjacent key image group, i.e., the width of the margin, as long as the vertical and horizontal widths of the screen are not exceeded respectively by the sums of the vertical widths and the horizontal widths of the basic keys and the application keys, which potentially interfere with each other in the vertical and horizontal directions of the screen when the size of the size variable key is modified (if the following formula (I) is satisfied).

$$K_v'(x) + \Sigma K_{Bi}(x) + \Sigma K_{Ai}(x) < X \text{ and}$$

$$K_v'(y) + \Sigma K_{Bi}(y) + \Sigma K_{Ai}(y) < Y \quad\quad\quad (I)$$

wherein X is the horizontal width of the screen, Y is the vertical width of the screen, $K_v'(x)$ is the horizontal width of the size variable key after the size modification, $K_v'(y)$ is the vertical width of the size variable key after the size modification, $K_B(x)$ is the horizontal width of the basic key, $K_B(y)$ is the vertical width of the basic key, $K_A(x)$ is the horizontal width of the application key prior to the size reduction, and $K_A(y)$ is the vertical width of the application key prior to the size reduction.

Figure 6:
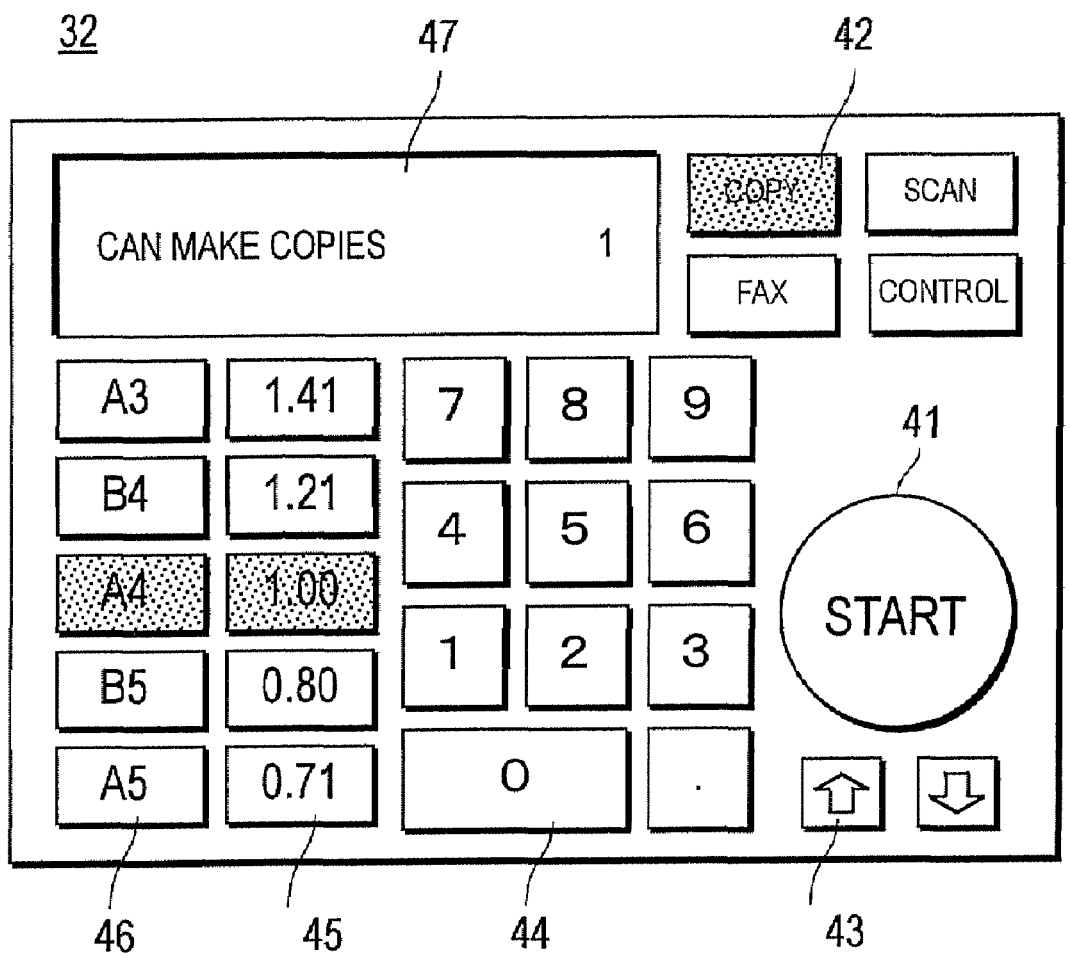
FIG. 6 is a screen obtained by enlarging the key image of a size variable key and modifying the layout of the initial screen of display 14a shown in FIG. 5.

FIG. 6 is a screen obtained by enlarging the size of the key image of the size variable key and modifying the layout of the initial screen of display 14a shown in FIG. 5. Since the sum of the horizontal widths of each key image group of the basic key, i.e., ten key 44, and the application keys, i.e., magnification key 45 and paper size key 46, which may interfere with each other in accordance with the enlargement of size variable key, i.e., start key 41, and the horizontal width of the key image of start key 41 after the size modification does not exceed the horizontal width of the screen 32, the layout is modified by adjusting the spaces between the key image groups.

On the contrary, if it is determined in FIG. 3 that it is impossible to display all the key images simultaneously on the screen as a result of the layout calculation in step S207 (S208: No), the sizes of the application keys are reduced until it becomes possible to display all the key images (S209), and the layout of the operating screen after the size reduction of the application keys is calculated again (S210). The screen control information is then updated by registering the size, the position information and others of each key image according to the calculated layout to the screen control information (S211), and the operating screen is displayed on display 14a based on the new layout modified according to said screen control information (S212) to terminate the operating screen display process.

Figure 8:
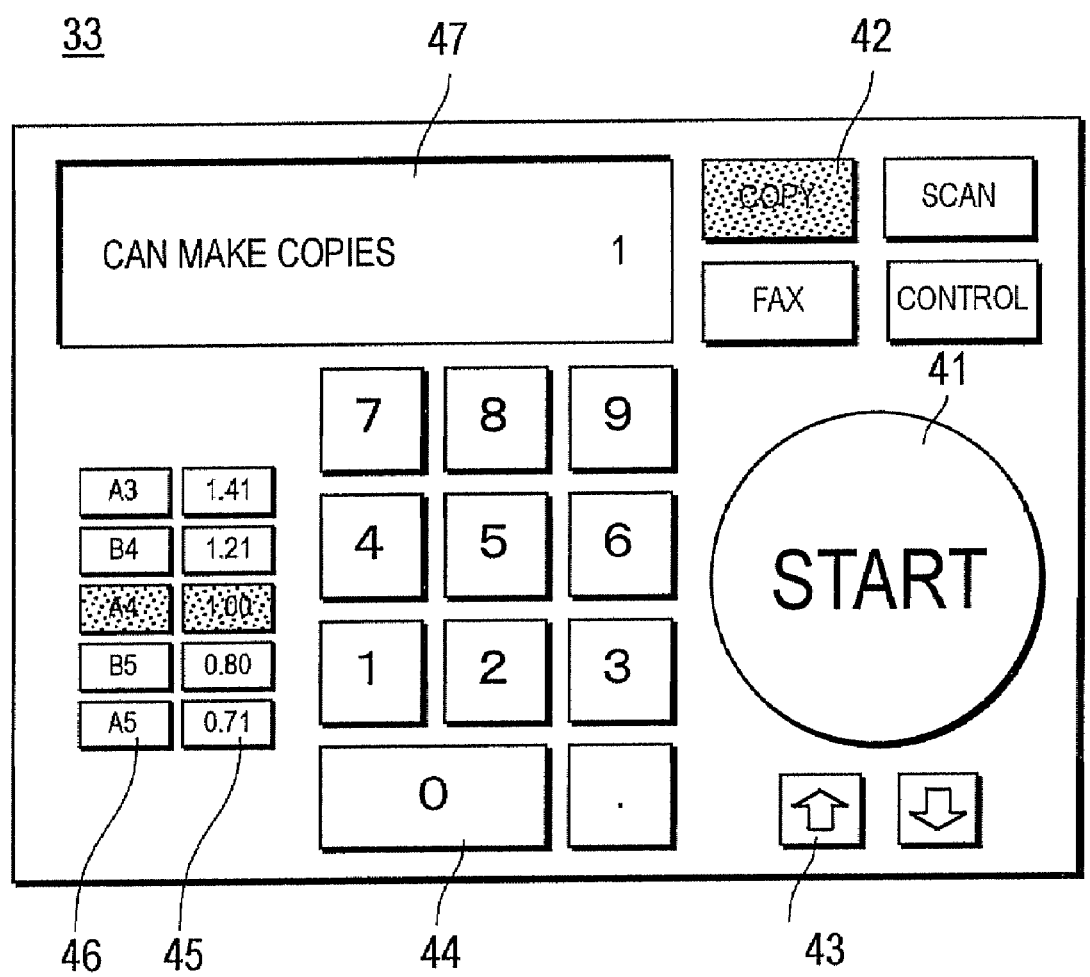
FIG. 8 is a screen obtained by modifying the layout based on the screen control information of FIG. 7.

FIG. 7 is an example of updated screen control information by further enlarging the size of the key image of the size variable key and modifying the layout of the screen of display 14a shown in FIG. 6, and FIG. 8 is a screen modified according to the screen control information of FIG. 7. In FIG. 7 and FIG. 8, since the sum of the horizontal widths of each key image group of a basic key, i.e., ten key 44, and application keys, i.e., magnification key 45 and paper size key 46, and start key 41 after the size enlargement exceeds the horizontal width of the screen, the layout is modified by reducing the sizes of each key image group of application keys, i.e., magnification key 45 and paper size key 46 so that all the key images can fit into the screen while maintaining the ratios between the vertical widths and the horizontal widths of the application keys as well as the size ratios between them based on the following formula (II), the result of which is shown in FIG. 33.

$$K_{Aj}'(x) = (X - (K_v'(x) + \Sigma K_{Bi}(x))) \times K_{Aj}(x) / \Sigma K_{Ai}(x)$$

$$K_{Aj}'(y) = K_{Aj}(y) \times K_{Aj}'(x) / K_{Aj}(x) \text{ or}$$

$$K_{Aj}'(y) = (Y - (K_v'(y) + \Sigma K_{Bi}(y))) \times K_{Aj}(y) / \Sigma K_{Ai}(y)$$

$$K_{Aj}'(x) = K_{Aj}(x) \times K_{Aj}'(y) / K_{Aj}(y) \tag{II}$$

wherein the symbols X, Y, $K_v'(x)$, $K_v'(y)$, $K_B(X)$, $K_B(y)$, $K_A(x)$, and $K_A(y)$ denote the same things as in the formula (I), while $K_A'(x)$ denotes the horizontal widths and $K_A'(y)$ denotes the vertical widths of application keys after the size reduction.

Although it is shown in the first embodiment described above that the layout of the screen is modified by reducing the sizes of the key images of the application keys while maintaining the layout of each key image and each key image group with modifying the size of the key image of the size variable key, the invention can also be constituted in such a way as to modify the screen layout by modifying the arrangement of each key image or each key image group on the operating screen by means of reducing the size of the key images of the application keys and using the publicly known two dimensional mapping algorithm.

Next, the second embodiment of the invention will be described below. MFP 1b in the present embodiment has a similar constitution as that of MFP 1a in the first embodiment (see FIG. 1) to perform the data input process with a similar procedure in MFP 1a (see FIG. 2), so that only the procedure of the operating screen display process, which is the characteristic part of MFP 1b, will be described.

Figure 9:
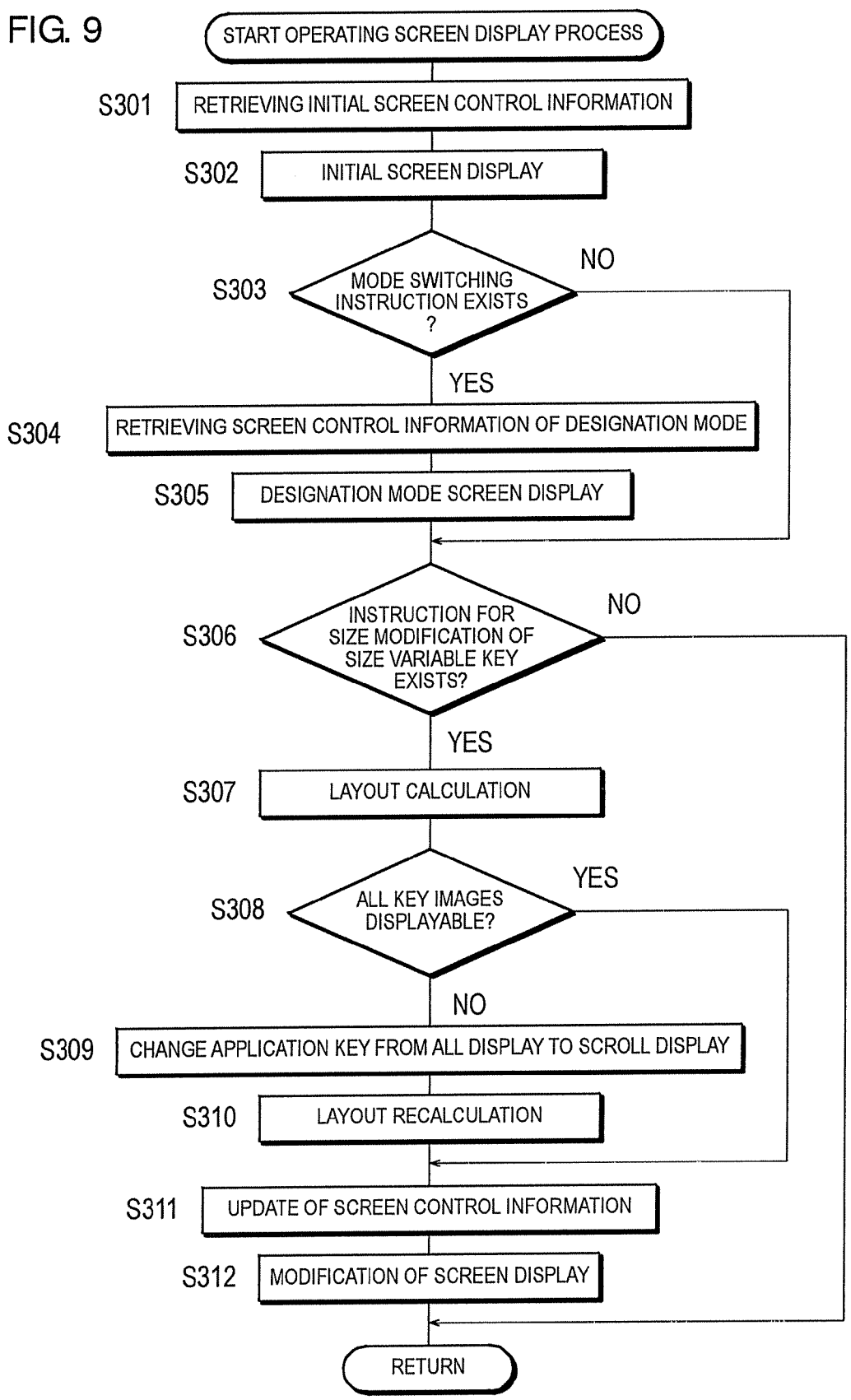
FIG. 9 is a flowchart showing the procedure of operating screen display process of operating panel unit 14 of an MFP 1b according to the second embodiment of the invention.

FIG. 9 is a flowchart showing the procedure of operating screen display process of an operating panel 14 of MFP 1b in this embodiment. The algorithm shown in the flow chart of FIG. 9 is stored as a program in ROM 12 of MFP 1b and executed by CPU 11. However, said program can be stored and executed in the display control unit (not shown) in operating panel 14.

In FIG. 9, MFP 1b first retrieves the initial screen control information stored in ROM 12 onto RAM 13 (S301), and displays the initial screen on display 14a of operating panel unit 14 based on the initial screen control information (S302) FIG. 10 is an example of initial screen control information of MFP 1b in this embodiment. In FIG. 10, initial screen control information 23 contains such information as "screen mode," "key image group," "key image classification," "constitutional key image," "key image data," "status," "attribute," etc., and these functions are identical to those described in the first embodiment. However, the "application key" in the "key image classification" is a key image to be displayed by changing in a scrolling display key, a pull-down display key and the like when it becomes impossible to display all the key images to be displayed simultaneously on the screen as a result of the size modification of the size variable key. The scrolling display key and the pull-down display key here mean keys to select and designate the data to be entered by means of scrolling and pull-down respectively. In initial screen control information 23, the start key is set as a size variable key, the mode switching key, the size modifying key, and the ten key are set as basic keys, while the magnification key and the paper size key are set as application keys. Also, the "status" shows the size (scale) and the position information of a key image on the screen when the key image is to be displayed on the screen, and indicates "no display" when the key image is not to be displayed.

Figure 11:
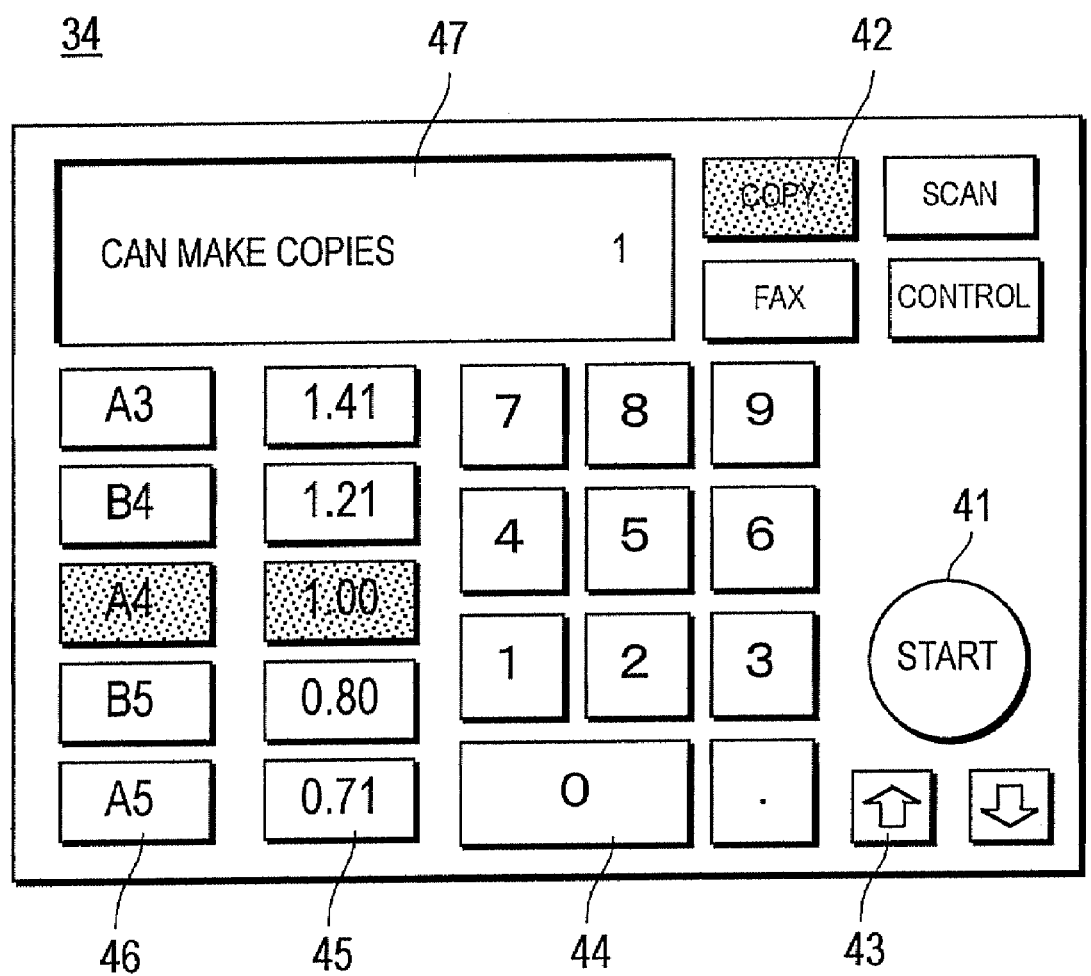
FIG. 11 shows an example of an initial screen displayed on a display 14a of control panel 14 of MFP 1b based on the initial screen control information shown in FIG. 10.

FIG. 11 shows an example of an initial screen displayed on a display 14a of control panel 14 of MFP 1b based on the initial screen control information shown in FIG. 10. In FIG. 11, key images related to start key 41, mode switching key 42, size modifying key 43, ten key 44, magnification key 45 and paper size key 46, as well as message display area 47 are displayed in their specified sizes on screen 34 base on initial screen control information 23.

In FIG. 9, when the user enters a mode switching instruction by means of designating mode switching key 42 on display 14a (S303: Yes), screen control information of designated mode stored on ROM 12 is retrieved onto RAM 13 in a similar manner as in step S301 and S302 (S304), and displays a screen of designated mode on display 14a based on the screen control information thus retrieved (S305).

Next, when the user enters an instruction for modifying the size of a size variable key by means of designating size modifying key 43 on display 14*a* (S306: Yes), MFP 1*b* calculates the layout of the operating screen when the size of the key image of the variable key is modified according to the size entered by the user (S307), and makes a judgment whether it is possible to display all the key images to be displayed on the screen simultaneously (S308). If it determines that it is possible to display all the key images on the screen simultaneously (S308: Yes), the screen control information is updated by registering the position information of each key image according to the calculated layout to the screen control information (S311), and the operating screen is displayed on display 14*a* based on the new layout modified according to said screen control information (S312) to terminate the operating screen display process.

The layout modification of the operating screen in accordance with the size modification of a size variable key in this embodiment is identical to what is described in the first embodiment (see FIG. 6) in a case where the sums of the vertical and horizontal widths of the key images of basic keys and application keys that are potentially interfering with each other in the vertical or horizontal direction of the screen in accordance with the size modification of the key image of the size variable key do not exceed the vertical and horizontal widths of the screen respectively (i.e., satisfy the aforementioned formula (I)).

On the other hand, if it becomes impossible to display all key images on the screen simultaneously (S308: No) as a result of the layout calculation in step S307 in FIG. 9, the application keys are switched from the mode of displaying all constitutional key images to the scroll display key mode (S309), and recalculate the layout of the operating screen after modifying the display of the application key (S310) The screen control information is then updated by registering the position information and others of each key image according to the calculated layout to the screen control information (S311), and the operating screen is displayed on display 14*a* based on the new layout modified according to said screen control information (S312) to terminate the operating screen display process.

Figure 13:
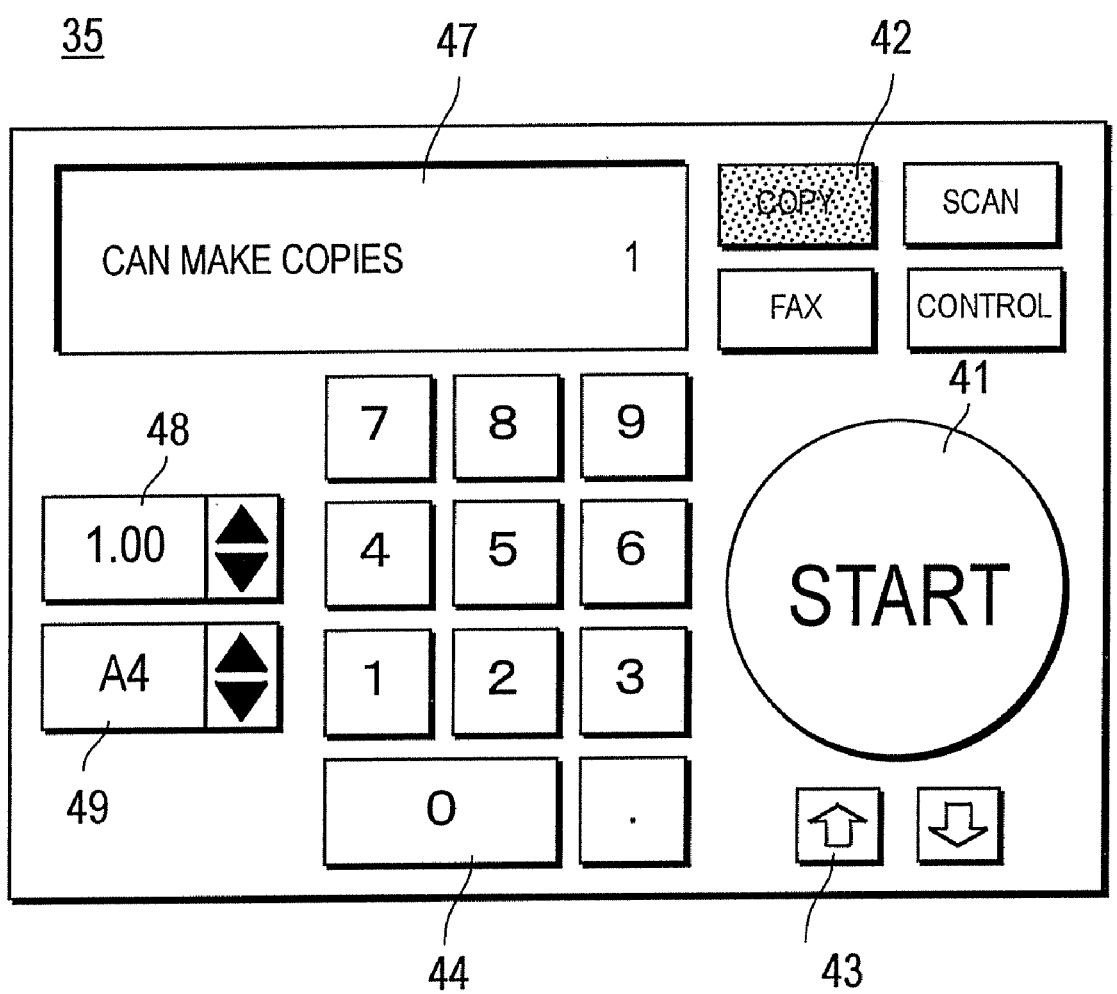
FIG. 13 is a screen obtained by modifying the layout based on the screen control information of FIG. 12.

FIG. 12 is an example of updated screen control information by further enlarging the size of the key image of the size variable key and modifying the layout of the screen of display 14*a* shown in FIG. 11, and FIG. 13 is a screen modified according to the screen control information of FIG. 12. In other words, in FIG. 12 and FIG. 13, the sum of the horizontal widths of each key image group of the basic key, i.e., ten key 44, and the application keys, i.e., magnification key 45 and paper size key 46, and start key 41 after the size enlargement exceeds the horizontal width of the screen, the layout modification is done by switching the mode of displaying all constitutional key images of the application keys, i.e., magnification key 45 and paper size key 46 to the scroll display key mode in which these constitutions are displayed by scrolling as shown in FIG. 33.

Although the screen layout is modified by modifying the application keys to the scroll display keys in accordance with the size modification of the key image of a size variable key in the second embodiment, it can also be constituted to modify the application key to the pull down display keys. Also, the invention can be constituted in such a way as to modify the layout by modifying the arrangement of each key image or each key image group on the operating screen by means of modifying the application keys to scroll display keys and pull down display keys while applying the two dimensional mapping algorithm which is known to the public.

Although it was shown in the above-mentioned embodiments that any user can modify the size of a size variable key, it can also be constituted to restrict the modification available only to an administrator by means of a password.

Moreover, although it was shown in the abovementioned embodiments that the screen control information prior to the layout modification in accordance with the size modification of a size variable key is to be updated with the screen control information after the modification, it is also possible to make each user to select a screen of the user's preference by allowing the screen control information after the modification to be registered anew.

Furthermore, although it was described in the above embodiments that the data input device of the invention is built into an MFP, the invention is not limited to such a case, but rather it can be applied to the data input device of various devices such as printers, digital copying machines, facsimile devices, computers such as installed personal computers, laptop computers, portable terminals such as cellular telephones, PHS.RTM., PDA, electronic pocketbooks, consumer electronics products such as TVs, stereo sets, microwave ovens, refrigerators, and various other devices.

The data input device and the data input method according to this invention can be realized by a dedicated hardware circuit for executing the abovementioned steps, or by causing a CPU to executed a program where said steps are described. If the present invention is to be materialized by the latter means, said programs for operating the data input device can be provided by computer-readable recording media such as a floppy.RTM. disk and CD-ROM, or can be provided on-line via a network such as the Internet. In this case, the program recorded on the computer readable recording medium is normally transferred to and stored in a memory device such as ROM and a hard disk.

As can be seen from the above, the invention is capable of providing a data input device having a touch panel on the display, showing a plurality of key images on its display screen, and, when an input designation area is designated corresponding to the display area of a key image on said display screen, entering data assigned to said key image; in particular, such a data input device that allows the operator to modify the sizes of specific operating keys arbitrarily and automatically modifies the layout of other keys.

What is claimed is:

1. A method for displaying a plurality of key icons on a display of an operating panel unit of a device controlled by user input, the method comprising:

displaying a first screen on the display of the operating panel unit of the device, the first screen comprising at least one first key icon and a plurality of second key icons, wherein the first key icon corresponds to a first input instruction while each of the second key icons respectively corresponds to a respective one of a set of second input instructions;

receiving, on the operating panel unit of the device, a user input containing an instruction to manipulate a size of the first key icon; and controlling the display of the operating panel unit of the device to, upon receipt of the user input, display a second screen on the display of the operating panel unit of the device, the second screen comprising at least one third key icon and a pull down menu, wherein the third key icon is bigger than the first key icon and corresponds to the first input instruction, and the pull down menu corresponds to the set of second input instructions.

2. The method of claim 1, wherein the operating panel unit of the device comprises a touch panel that receives the user input that controls the display of the operating unit panel of the device to change the display from the first screen to the second screen.

3. The method of claim 1, wherein the display of the operating panel unit of the device is associated with an image reading device for obtaining image data by reading document images, a printing device for printing the image data, or a transmitting device for transmitting image data.

4. The method of claim 2, wherein the display of the operating panel unit of the device is associated with an image reading device for obtaining image data by reading document images, a printing device for printing the image data, or a transmitting device for transmitting image data.

5. The method of claim 1, wherein the operating panel unit of the device receives a user input of a manipulation of a size modifying key that controls the display of the operating panel unit of the to change the display between the first screen and the second screen.

6. The method of claim 1, wherein the set of second input instructions are exclusive to each other.

7. A computer readable storage medium storing a computer executable program that causes a device to control a display device of an operating panel unit to display a plurality of key icons on a display, the method comprising:

displaying a first screen on the display of the operating panel unit of the device, the first screen comprising at least one first key icon and a plurality of second key icons, wherein the first key icon corresponds to a first input instruction while each of the second key icons respectively corresponds to a respective one of a set of second input instructions;

receiving a user input containing an instruction to manipulate a size of the first key icon on the operating panel unit of the device; and controlling the display of the operating panel unit of the device to, upon receipt of the user input, to display a second screen on the display of the operating panel unit of the device, the second screen comprising at least one third key icon and a pull down menu, wherein the third key icon is bigger than the first key icon and corresponds to the first input instruction, and the pull down menu corresponds to the set of second input instructions.

8. The computer readable storage medium of claim 7, wherein the operating panel unit of the device comprises a touch panel that receives the user input that controls the display of the operating unit panel of the device to change the display from the first screen to the second screen.

9. The computer readable storage medium of claim 8, wherein the display of the operating panel unit of the device is associated with an image reading device for obtaining image data by reading document images, a printing device for printing the image data, or a transmitting device for transmitting image data.

10. The computer readable storage medium of claim 7, wherein the display of the operating panel unit of the device is associated with an image reading device for obtaining image data by reading document images, a printing device for printing the image data, or a transmitting device for transmitting image data.

11. The computer readable storage medium of claim 7, wherein the operating panel unit of the device receives a user input of a manipulation of a size modifying key that controls the display of the operating panel unit of the to change the display between the first screen and the second screen.

12. The computer readable storage medium of claim 7, wherein the set of second input instructions are exclusive to each other.

* * * * *